Figure 1:
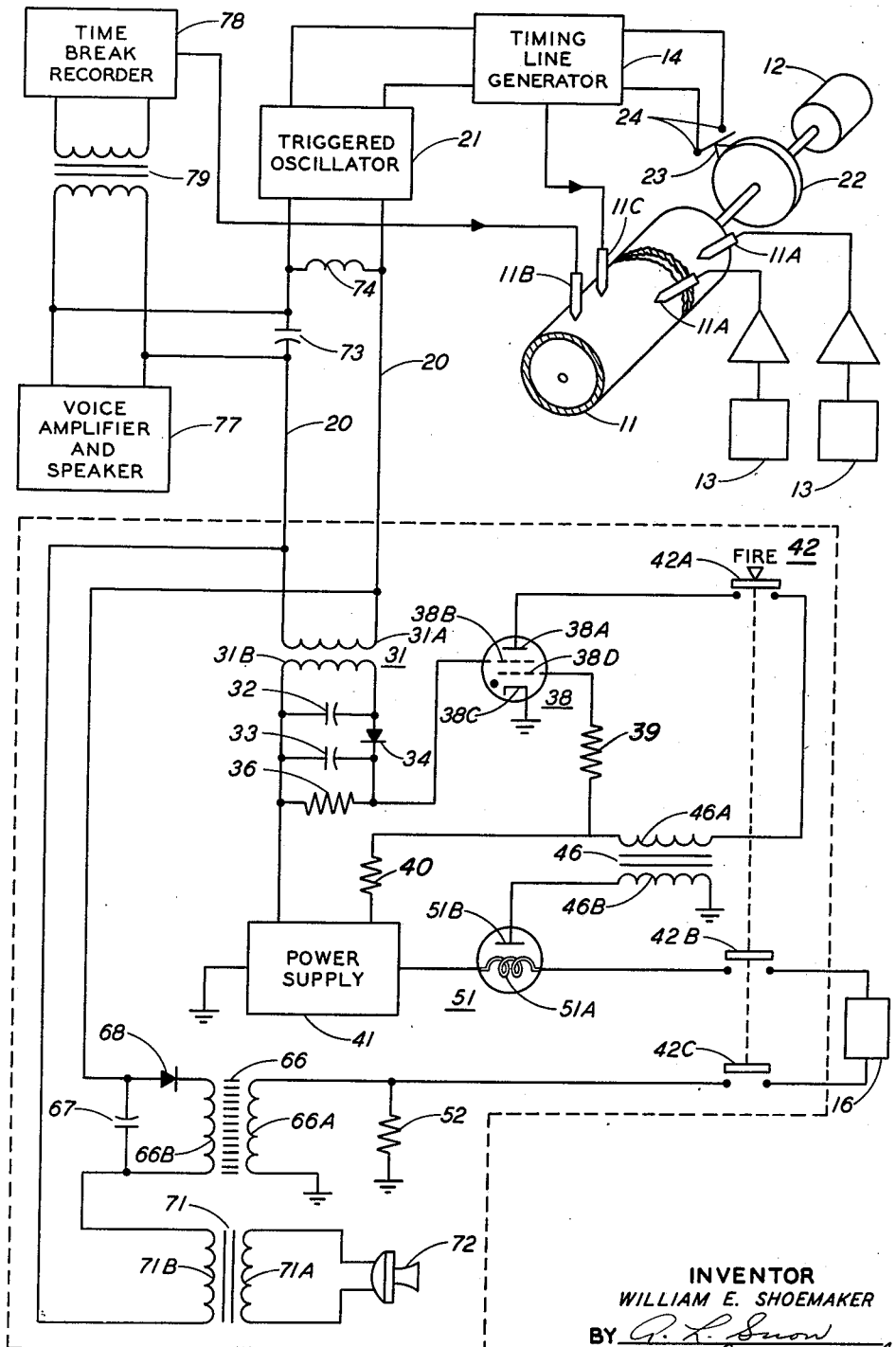

March 1, 1960

W. E. SHOEMAKER 2,926,739

APPARATUS FOR CONTROLLING INITIATION OF
SEISMIC DISTURBANCES

Filed Jan. 20, 1955

2 Sheets-Sheet 1

INVENTOR
WILLIAM E. SHOEMAKER
BY
ATTORNEYS

March 1, 1960 W. E. SHOEMAKER 2,926,739
APPARATUS FOR CONTROLLING INITIATION OF
SEISMIC DISTURBANCES
Filed Jan. 20, 1955 2 Sheets-Sheet 2

INVENTOR
WILLIAM E. SHOEMAKER
BY
ATTORNEYS 2,926,739

APPARATUS FOR CONTROLLING INITIATION OF SEISMIC DISTURBANCES

William E. Shoemaker, Fullerton, Calif., assignor to California Research Corporation, San Francisco, Calif., a corporation of Delaware Application January 20, 1955, Serial No. 483,150

4 Claims. (Cl. 181—.5)

This invention relates in general to seismic prospecting and relates more particularly to methods of and apparatus for controlling the creation of a seismic disturbance.

In the art of seismic prospecting, an artificial seismic disturbance is created in the earth and part of the energy from the disturbance is refracted and reflected from various subsurface strata back to the surface of the earth, and the returning energy is converted by seismic wave detectors into electrical signals varying in sympathy with movement of the earth. The seismic disturbance may be created by any of a number of suitable well-known means, such as the detonation of an explosive charge or the dropping on the earth's surface of an elevated weight. In the case of explosives, the creation of the explosion is usually manually controlled from a blasting device which is located at a distance from both the explosives and the recording truck and which is connected by a telephone and time-break line to the recording truck.

It is often desirable to control the creation of the seismic disturbance at a point remote from both the source and, in the case of explosives, the blasting device. Such remote control is desirable, for example, in the trace integration method of seismic prospecting, in which a plurality of seismic disturbances is sequentially created and the resulting seismic detector signals from each of the disturbances are recorded on a reproducible recording medium for mixing or integration. In this method, it is desirable that all of the signals from the different disturbances be recorded in the same time relationship to each other so that accurate mixing may be accomplished, and this, in turn, makes it desirable that the recording medium be in the same portion of its cycle at the moment of creation of each of the disturbances. Thus, it is desirable to synchronize the creation of the seismic disturbance with the operation of the recording medium.

Heretofore, such remote control has been effected through the use of electro-mechanical relays which are energized in response to a signal from the recording medium and which initiate the seismic disturbance through the release of an elevated weight or the rupturing of an electric firing cap controlling the detonation of an explosive charge. However, the use of such relays is objectionable because of the inherent time delay involved, since even the most rapid of such relays usually involves a time delay between initiation of the energizing pulse and closure of the relay contacts on the order of 4 to 10 milliseconds. The undesirability of this delay is apparent when it is considered that it is usually desired to measure time intervals on the seismic records with greater accuracy than the delay period of the relay. An additional objection to the use of such relays is that they require additional wiring from the recording truck to the blasting control device, thereby increasing the complexity of the system and the length of time required to set up the equipment.

Broadly, the present invention contemplates methods of and apparatus for generating and recording seismic data utilizing a control device which is operative to initiate a seismic disturbance substantially instantaneously upon receipt of an initiating signal. More particularly, the present invention contemplates the use of a control device employing a pair of gaseous discharge tubes which may be remotely controlled and which are rendered conductive substantially instantaneously upon receipt of the initiating signal to supply a signal to the disturbance-creating means. The control device preferably also has incorporated therein a voice transmission network for audio communication and a time-break network for generating a signal indicating the instant of creation of the disturbance. By suitable design of the circuits, a single electrical circuit may be utilized to carry the initiating impulse from the recording unit to the control device and to transmit the time break and voice signals from the control device to the recording unit.

Additionally, where a charge of explosives is detonated by the passage of an electric current through a firing cap, the control device of this invention provides a time-break signal indicating the instant of rupturing of the firing cap rather than the instant of the start of current flow through the cap, as is common in most blasting control devices. Since there may be an appreciable lapse of time between the start of current flow through the cap and the actual rupturing of the cap, it is desirable that the instant of cap rupture be recorded to permit accurate analysis of the resulting seismic records. Preferably, an impulse responsive network is utilized which is insensitive to the electrical impulse resulting from the start of current flow through the firing cap, but which is responsive to the electrical impulse resulting from the abrupt decrease in current when the firing cap ruptures.

An additional feature which may be incorporated into the blasting control circuit is the synchronization of the recorder timing line generator with the control device so that the time line generator produces a predetermined type of timing line at the instant of creation of the seismic disturbance, thus facilitating time correlation from the time-break of events on the resulting seismic record. Such synchronization may be effected either by causing the timing line generator to trigger the initiating pulse when the timing line generator is generating the predetermined type of timing line, or by causing the time-break pulse, indicative of the instant of creation of the seismic disturbance, to control the timing line generator to generate the predetermined type of timing line.

It is, therefore, an object of the present invention to provide improved methods of and apparatus for generating seismic disturbances.

It is an additional object of the present invention to provide improved apparatus for controlling the firing of an electric blasting cap to detonate a charge of explosives, in which an indication is provided of the exact instant of rupturing of the cap.

It is a further object of this invention to provide methods of and apparatus for controlling the firing of an electric blasting cap to detonate a charge of explosives utilizing an electrical impulse responsive network which is insensitive to the impulse resulting from the start of current flow through the firing cap and which responds only to the impulse resulting from cessation of current flow through the cap.

It is a further object of this invention to provide improved apparatus for recording seismic data produced by a seismic disturbance in which a repetitive series of timing lines is recorded simultaneously with the seismic data and in which a predetermined type of timing line is produced at the instant of creation of the seismic disturbance.

It is an additional object of the present invention to provide apparatus for recording seismic data produced by a seismic disturbance, in which a repetitive series of reference timing lines is recorded simultaneously with the seismic data and in which an impulse generated at the instant of creation of the seismic disturbance is utilized to produce a characteristic type of timing line.

Figure 2:
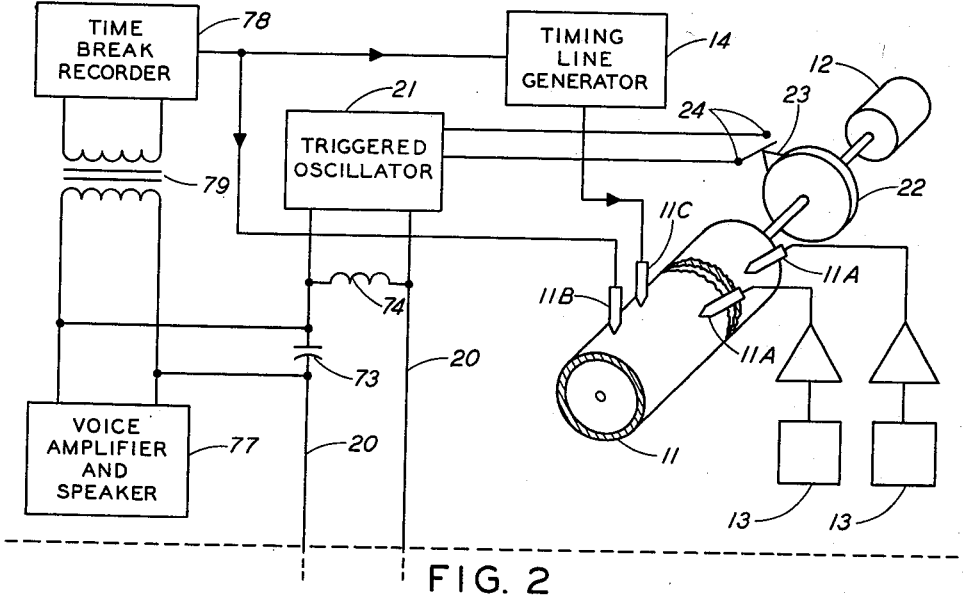
Figure 3:
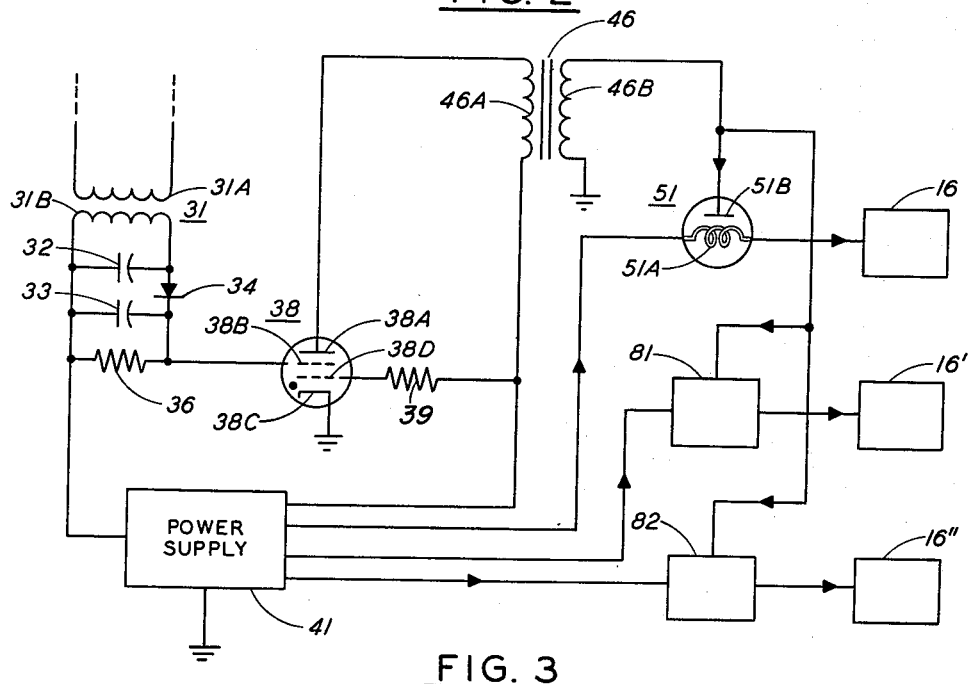

Objects and advantages other than those set forth above will be apparent from the following description when read in conjunction with the accompanying drawing, in which:

Fig. 1 diagrammatically and schematically illustrates one embodiment of the present invention for controlling the creation of a single seismic disturbance;

Fig. 2 illustrates an alternate embodiment of the invention in which the timing line generator is controlled by the time-break signal to generate a predetermined type of timing line; and Fig. 3 illustrates an additional embodiment of the invention for controlling the creation of a plurality of seismic disturbances.

Referring to Fig. 1 by character of reference, numeral 11 designates a recording medium on which seismic data is recorded. Such medium may be of any suitable known type, such as photographic, electrostatic or magnetic on which the seismic data may be recorded. For example, recording medium 11 may be a layer of magnetizable material mounted on a rotor and driven by a motor 12. The recording device also has a plurality of recording heads 11A connected to a plurality of seismic wave detectors 13 for variably magnetizing medium 11 in response to variation in the signal from detectors 13. The recorder is also provided with a recording head 11B for recording a time-break signal. Although, for simplicity, only two seismic wave detectors and two associated recording channels have been illustrated, it will be understood that, in practice, a considerable number of such detectors and recording channels are normally utilized. A timing line generator 14 may be provided to supply to a recording head 11C a series of timing pulses which are recorded on medium 11 concurrently with the recording of the seismic detector signals. Generator 14 may be of any suitable type, such as one which generates a series of pulses in which every fifth or tenth pulse is of larger amplitude or longer duration than the other pulses. Examples of timing line generators suitable for this purpose may be found in the following publications: "Electronic Time Measurements," Chance, Hulsizer, MacNichol and Williams, First Edition, published by McGraw-Hill Book Company, Inc., 1949, especially chapter 4, pages 81 et seq.; and "RCA Review," vol. X, No. 4, December 1949, the article "Direct-Reading Electronic Timer" by R. R. Freas, pages 554 et seq.

The seismic disturbance producing the data to be recorded on medium 11 may be created by any suitable means, such as the detonation of an explosive charge through the rupturing of an electric firing cap or through the dropping to the earth of an elevated weight. Means for controlling the creation of the disturbance are shown diagrammatically at 16, and it is understood that such means may control any suitable type of seismic disturbance. Energization of initating means 16 is controlled from an oscillator 21 which generates an initiation signal at a predeterminable time. Oscillator 21 may be controlled from a push-button-type firing lever similar to those commonly associated with conventional blasters or may, as in the particular embodiment illustrated in Fig. 1, be controlled from recording medium 11 through generator 14. In the embodiment illustrated in Fig. 1, it is assumed that recorder 11 is remotely located from the source of seismic disturbance and from the control device itself, and that it is desired to remotely energize device 16 at a predetermined point in the cycle of recording medium 11. The blasting control device components are shown in the dotted enclosure of Fig. 1 to indicate that the device is located at a distance from energizing device 16 and the recording equipment.

The shaft driving recording medium 11 is provided with a disc 22 having a projection 23 at one point thereon for closing a pair of contacts 24 in the input circuit of timing line generator 14. Closure of contacts 24 triggers generator 14, and when generator 14 generates the next wide or heavy timing line, a pulse is supplied from generator 14 to trigger oscillator 21. Oscillator 21 preferably generates a radio frequency signal, such as a 100-kilocycle signal, which is supplied through a pair of conductors 20 to the primary winding 31A of a transformer 31 having a secondary winding 31B. Conductors 20 represent the single electrical circuit between the recorder and the blaster over which all of the desired signals are transmitted. Secondary winding 31B is preferably tuned with a capacitor 32 to the frequency of oscillator 21 to prevent transmission through transformer 31 of signals having other than the desired frequency. The output from secondary winding 31B charges a capacitor 33 through a half-wave rectifier 34.

A grid leak resistor 36 is provided in parallel with capacitor 33, and the voltage across capacitor 33 is supplied to the control grid 38B of a gaseous discharge tube 38. Tube 38 is preferably of the cold cathode type requiring no filament or cathode heating supply and is provided with an anode 38A, a control grid 38B, a cathode 38C and a suppressor grid 38D. One common terminal of capacitor 33 and resistor 36 is connected to grid 38B, and the other common terminal of these elements is connected to an output terminal of a power supply 41. Power supply 41 may be of any suitable known type, such as the conventional hand-cranked generator commonly associated with blasters or a battery and vibrator-type power supply. The voltage supplied from source 41 to the grid circuit of tube 38 is adjusted so that, in the absence of a signal from oscillator 21, the potential of grid 38B is just sufficient to prevent discharge of the tube. Upon receipt of a signal from oscillator 21, the voltage developed across capacitor 33 renders grid 38B sufficiently positive to cause tube 38 to conduct.

Anode 38A is connected through contacts 42A of a safety interlock switch 42 to one terminal of a primary winding 46A of a step-up transformer 46 having a secondary winding 46B. The other terminal of primary winding 46A is connected through a resistor 49 in parallel to an output terminal of power supply 41 and through a resistor 39 to suppressor grid 38D of tube 38. One terminal of secondary winding 46B is connected to ground, and the other terminal of this winding is connected to the control element 51B of a gaseous discharge tube 51 which controls the energization of device 16. Tube 51 may be of any suitable type, but is preferably an electronic flash tube having a controlled element 51A in the form of a helically wound length of tubing containing a suitable ionizable gas. One particularly suitable type of tube utilizes a length of helically wound glass tubing filled with argon and having electrical leads at each end thereof. One of these leads is connected to an output terminal of power supply 41, and the other lead is connected through contacts 42B and 42C of safety interlock switch 42 to initiating device 16.

In the absence of sufficient potential between control element 51B and element 51A, element 51A is rendered non-conductive so that substantially no current flows therethrough and through initiating device 16. When a voltage of sufficient magnitude is impressed across element 51B and control element 51A from transformer 46, the gas in element 51A ionizes to substantially instantaneously render element 51A conductive and transmit current from source 41 to initiating device 16. Preferably, a resistor 52 is provided in the circuit of tube 51 and device 16 to permit a rapid buildup of the current through device 16.

To provide an accurate measure of the instant of initiation of the seismic disturbance, a suitable time-break recording network is provided. This network may include a saturable transformer 66 having a primary winding 66A and a secondary winding 66B. Primary winding 66A is connected in parallel with resistor 52 and receives current when current flows through initiating device 16. Secondary winding 66B has a capacitor 67 and a half-wave rectifier 68 connected thereacross. One terminal of capacitor 67 is connected through the secondary winding 71B of an audio transformer 71 having a primary winding 71A connected to a microphone or other suitable speaker 72. Speaker 72 is preferably incorporated in the blasting control device itself to provide communication between the recording unit and the blaster. The other terminal of capacitor 67 and the other terminal of secondary winding 71B are connected to leads 20.

A radio frequency by-pass capacitor 73 and an audio and time-break by-pass inductor 74 are provided between the recording equipment and the blasting control device to selectively control the flow of current from oscillator 21, time-break transformer 66 and audio transformer 71, as will be more fully explained below. An audio amplifier and speaker device 77 is connected across capacitor 73, and a time-break recording device 78 connected to time-break recording head 11B is also connected across capacitor 73 through a transformer 79.

In operation of the system, assuming that motor 12 is operating to drive recording medium 11, the shooter or other person in charge of the firing of the charge presses firing switch 42 to close contacts 42A, 42B and 42C. This action is permissive only and does not necessarily initiate creation of the disturbance, since the firing is controlled from recorder 11 and switch 42 is provided only to prevent premature or accidental initiation of the seismic disturbance. When cam 22 is rotated to the position to close contacts 24, indicating that the desired portion of the recording cycle of recording medium 11 has been reached, timing line generator 14 is triggered and when generator 14 generates the next heavy or wide timing line, a pulse is supplied to trigger oscillator 21. Since oscillator 21 is triggered by a heavy or wide timing line from generator 14, this heavy time line will be substantially coincident with the time-break pulse, indicating the instant of creation of the seismic disturbance, thus facilitating subsequent time computations of events on the seismic record.

The radio frequency pulse from oscillator 21 does not enter the audio amplifier network 77 and the time-break recording network 78 because of radio frequency by-pass capacitor 73. The radio frequency pulse is transmitted through transformer 31B to charge capacitor 33, and this charging of capacitor 33 increases the potential of grid 38B to a value sufficient to render tube 38 substantially instantaneously conductive. When tube 38 is rendered conductive, a pulse is supplied through primary winding 46A of transformer 46. The magnitude of this pulse is increased by the step-up ratio of transformer 46 to produce a large voltage in secondary winding 46B. The voltage across secondary winding 46B is applied between control electrode 51B and element 51A and is of sufficient magnitude to render tube 51 substantially instantaneously conductive. When tube 51 is rendered conductive, its resistance drops to substantially zero so that a large current flows through tube 51 and device 16 from power supply 41 to energize device 16 and thus create the seismic disturbance. Energy from the seismic disturbance is detected by detectors 13 and recorded on recording medium 11 to provide the desired seismic data.

To provide on the recording medium an indication of the instant of creation of the seismic disturbance, a portion of the current supplied through device 16 is supplied to primary winding 66A of transformer 66. Assuming that energizing device 16 is an electric firing cap which ruptures upon flow of sufficient current therethrough to detonate a charge of explosives, the current through device 16 and transformer winding 66A will first increase to a large value when tube 51 is rendered conductive and will then drop to zero when the firing cap ruptures. Since the rupturing of the firing cap indicates the instant of the creation of the disturbance, it is desirable to record this instant as the time break rather than the instant at which current started to flow through the firing cap, since there may be appreciable time lapse between occurrence of these two events.

When tube 51 is rendered conductive, the current flow through primary winding 66A of saturable transformer 66 produces in secondary winding 66B a peak voltage at the instant of the start of this current flow. However, half-wave rectifier 68 is so poled as to block the flow of current from this voltage, and capacitor 67 is consequently not charged. When the firing cap of device 16 ruptures, the current flow therethrough abruptly decreases, producing a flux change in the core of transformer 66 which, in turn, produces another peaked voltage across secondary winding 66B. The poling of rectifier 68 is such as to permit current flow through capacitor 67 in response to this voltage so that the voltage across capacitor 67 abruptly increases to produce a steeply rising time-break pulse. The voltage across capacitor 67 is impressed through capacitor 73 and transformer 79 to time-break recorder 78 and thence to time-break recording head 11B. By-pass inductor 74 prevents any substantial energy from the time-break pulse from entering oscillator 21, and the tuning of secondary winding 31B prevents any substantial energy from the time-break pulse from entering the firing circuits. Thus, it will be seen that a time-break pulse is created which indicates the exact instant of creation of the seismic disturbance, so that an accurate correlation of the seismic data may be made.

Fig. 2 illustrates an alternate embodiment of the invention in which the occurrence of the time break is utilized to control generation by timing line generator 14 of a heavy or otherwise distinctive timing line. In Fig. 2, closure of contacts 24 by rotation of disc 22 and projection 23 energizes oscillator 21 to supply an initiating pulse through transformer 31 to the blasting circuit, as described above in connection with the embodiment illustrated in Fig. 1. Timing line generator 14 is also operating at this time and is generating timing lines which are supplied to timing head 11C and to any associated camera or other permanent recording device.

When the seismic disturbance is created by energization of device 16, the time-break impulse indicating the instant of creation of the disturbance is supplied through saturable transformer 66 and its associated elements 67 and 68 to time-break recording transformer 79 and time-break recorder 78. The output pulse from time-break recorder 78 is supplied jointly to time-break recording head 11B and to timing line generator 14. The time-break pulse supplied to timing line generator 14 operates to cause timing line generator 14 to generate a heavy timing line which is the beginning of a repetitive series of timing lines, so that the time-break pulse recorded by recording head 11B is coincident with a heavy timing line generated by generator 14 and recorded by recording head 11C, and a new series of repetitive timing lines commences with the time break. With timing line generator 14 operating prior to receipt of the time-break pulse, a record with timing lines thereon will be obtained even if no time-break pulse is received by recorder 78. The outputs from seismic wave detectors 13 are then recorded on recorder 11 in the usual manner.

Fig. 3 illustrates an additional alternate embodiment of the present invention utilized to control the energization of a plurality of seismic sources. In Fig. 3, the energizing pulse is supplied through transformer 31 and its associated elements to the grid of tube 38 to thereby render tube 38 conductive. Conduction of tube 38 supplies an impulse through impulse transformer 46 to the grid 51B of photo-flash tube 51, and conduction of tube 1 supplies an energizing pulse to device 16 to initiate creation of the seismic disturbance, substantially as described above in connection with the embodiments of Figs. 1 and 2.

Portions of the pulse from transformer 46 are also simultaneously supplied to devices 81 and 82 which control additional initiating devices 16' and 16". It will be understood that devices 81 and 82 would comprise other photo-flash tubes similar to tube 51. Each of the initiating devices 16, 16', 16" is thus controlled by the single signal from oscillator 21, and additional devices similar to elements 81 and 82 may be similarly connected to control any suitable number of initiating devices. It will be understood in Fig. 3 that suitable circuitry for providing the safety interlock switching and time-break recording will be provided in a manner similar to that shown in the embodiment of Fig. 1.

Although but a few embodiments of the present invention have been illustrated and described, it will be obvious to those skilled in the art that various changes and modifications may be made therein without departing from the spirit of the invention or the scope of the appended claims.

I claim:

1. In a seismic wave generating and recording system, the combination of means for creating a seismic disturbance, a recording medium for recording seismic detector signals resulting from said disturbance, a timing reference generator for generating a series of reference timing signals, said series comprising trains of identical signals separated at regular intervals by signals of distinctive character, means for supplying said reference timing signals to said recording medium prior to creation of said disturbance, a blasting device for energizing said disturbance-creating means, time-break generating means responsive to energization of said disturbance-creating means for providing a time-break signal indicative of the instant of creation of said disturbance, and means connecting said time-break generating network to said reference timing generator to cause said timing generator to generate one of said timing signals of distinctive character which is the beginning of a new train of said signals upon generation of said time-break signal.

2. In a seismic wave generating and recording system, the combination of means for creating a seismic disturbance a recording medium for recording seismic detector signals resulting from said disturbance, a timing reference generator for generating a series of reference timing signals, said series comprising trains of identical signals separated at regular intervals by signals of distinctive character, means for supplying said reference timing signals to said recording medium prior to creation of said disturbance, a blasting device for supplying an electrical pulse to energize said disturbance-creating means, time-break generating means responsive to cessation of said current pulse for providing a time-break signal indicative of the instant of creation of said disturbance, and means connecting said time-break generating network to said reference timing generator to cause said timing generator to generate one of said timing signals of distinctive character which is the beginning of a new train of said signals upon generation of said time-break signal.

3. In a seismic wave generating and recording system, the combination of means for creating a seismic disturbance, a rotatable recording medium for recording seismic detector signals resulting from said disturbance, a timing reference generator for generating a series of reference timing signals, said series comprising trains of identical timing signals separated at regular intervals by signals of distinctive character, means for supplying said reference timing signals to said recording medium prior to creation of said disturbance, a blasting device for energizing said disturbance-creating means, means responsive to a predetermined rotative position of said recording medium for energizing said blasting device, time-break generating means responsive to energization of said disturbance-creating means for providing a time-break signal indicative of the instant of creation of said disturbance, and means connecting said time-break generating network to said reference timing generator to cause said timing generator to generate one of said timing signals of distinctive character which is the beginning of a new train of said signals upon generation of said time-break signal.

4. In a seismic wave generating and recording system, the combination of an electric firing cap which ruptures upon passage of sufficient current therethrough for detonating a charge of explosives to create a seismic disturbance, a rotatable recording medium for recording seismic detector signals resulting from said disturbance, a timing reference generator for generating a series of reference timing signals, said series comprising trains of identical signals separated at regular intervals by signals of distinctive character, means for supplying said reference timing signals to said recording medium prior to creation of said disturbance, a blasting device for supplying an electrical current pulse to said firing cap to detonate said explosives, means responsive to a predetermined rotative position of said recording medium for energizing said blasting device, time-break generating means including a saturable transformer having a primary winding traversed by at least a portion of said current pulse and responsive to cessation of said current pulse for providing a time-break signal indicative of the instant of rupturing of said cap, and means connecting said time-break generating network to said reference timing generator to cause said timing generator to generate one of said timing signals of distinctive character which is the beginning of a new train of said signals upon generation of said time-break signal.

References Cited in the file of this patent

UNITED STATES PATENTS

| | | |
|---|---|---|
| 2,088,588 | Dudley | Aug. 3, 1937 |
| 2,275,316 | Ritzmann | Mar. 3, 1942 |
| 2,331,623 | Parr | Oct. 12, 1943 |
| 2,338,872 | Robidoux | Jan. 11, 1944 |
| 2,626,004 | Hasbrook | Jan. 20, 1953 |
| 2,697,648 | Kerr et al. | Dec. 21, 1954 |
| 2,707,524 | Montgomery | May 3, 1955 |
| 2,767,389 | McCollum | Oct. 16, 1956 |